United States Patent [19]

Robinson

[11] Patent Number: 4,591,854
[45] Date of Patent: May 27, 1986

[54] TOUCH CONTROL IDENTIFICATION SYSTEM WITH PORTABLE ENCODER

[75] Inventor: Alan W. Robinson, Northumberland, England

[73] Assignee: Roundel Electronics Limited, Tyne & Wear, England

[21] Appl. No.: 541,162

[22] Filed: Oct. 12, 1983

[30] Foreign Application Priority Data

Oct. 12, 1982 [GB] United Kingdom ............ 8229095

[51] Int. Cl.$^4$ .................................................. H04Q 1/00
[52] U.S. Cl. ........................ 340/825.31; 340/562; 340/825.23
[58] Field of Search .............. 340/825.31, 825.72, 340/825.54, 825.23, 562; 361/171, 172, 179-181

[56] References Cited

U.S. PATENT DOCUMENTS

| 3,168,737 | 2/1965 | Weinstein . | |
|---|---|---|---|
| 3,196,440 | 7/1965 | Weinstein | 340/825.72 |
| 3,706,008 | 2/1972 | Kremer . | |
| 3,939,679 | 2/1976 | Barker et al. | 70/277 |
| 4,320,387 | 3/1982 | Powell | 340/825.34 |
| 4,364,043 | 12/1982 | Cole et al. | 340/825.54 |
| 4,453,161 | 6/1984 | Lemelson | 340/825.31 |
| 4,470,046 | 9/1984 | Betsill | 340/825.23 |

FOREIGN PATENT DOCUMENTS

| 2657182 | 6/1978 | Fed. Rep. of Germany . |
|---|---|---|
| 2159362 | 8/1973 | France . |
| 2180349 | 11/1973 | France . |
| 8101063 | 4/1981 | PCT Int'l Appl. . |
| 1414119 | 11/1975 | United Kingdom . |
| 1414120 | 11/1975 | United Kingdom . |
| 1422217 | 1/1976 | United Kingdom . |
| 2060174A | 4/1981 | United Kingdom . |
| 2077556A | 12/1981 | United Kingdom . |
| 2082804A | 3/1982 | United Kingdom . |

*Primary Examiner*—Donald J. Yusko
*Attorney, Agent, or Firm*—Cushman, Darby & Cushman

[57] ABSTRACT

A personnel identification system for controlling access to restricted equipment or restricted areas comprises a portable device such as a wrist watch (10) in which a unique digital identification code is stored, and a static control unit having a conductive touch element (12) and a code signal receiver (14) for comparing the identification code with a stored access code. The watch (10) includes a transmitter for transmitting the identification code as a modulated alternating signal by electrical conduction through the wearer's body to the touch element (12), so as to provide resistance to interfering radiated signals. The receiver includes a separate touch sensing circuit for sensing physical contact on the element (12) so that decoding circuitry in the receiver is activated only when contact is sensed thereby enhancing resistance to radiated signals and substantially ensuring that the identification code signal is received at sufficient strength, given the power restrictions of a battery operated portable device, for reliable detection and validation of the identification code.

18 Claims, 6 Drawing Figures

TOUCH CONTROL IDENTIFICATION SYSTEM WITH PORTABLE ENCODER

This invention relates to a personnel identification security system.

In situations where it is required to identify a person before allowing access to for example a room, or before allowing a machine to be operated, various means of automatic identification have been used. Such means have included key switches, magnetic cards, keyboards for entering or identifying combinations and other devices. Devices are also known which comprise small radio transmitters or responders which are carried by for example authorised personnel to activate receivers by very short range radio transmission. However, these known devices are either relatively time-consuming or inconvenient in use, or are complex and hence expensive. Interference problems have also been experienced with short range radio transmitters, especially where several persons carrying such a device are simultaneously in the region of the receiver in question, as for example when a number of shop assistants are in the region of a cash till. It is an object of this invention to provide an identification system which offers an improvement over the known devices.

The invention provides a security system for confining the use of equipment to an authorised user or users, wherein the system comprises:

(i) at least one portable device to be worn or carried by a respective authorised user, the device having a store for storing a respective unique digital identification code, and a transmitter for transmitting the code in a predetermined format; and (ii) a control unit to be coupled to the said equipment, the unit comprising detection circuitry for receiving the transmitted code and comparing it with an internally stored access code, a trigger element requiring physical contact by the user for activating the detection circuitry, and a security circuit for enabling the said equipment only when the detection circuitry detects a match between the transmitted code and the access code.

By providing for activation of the detection equipment circuitry in response to some physical contact between the user and the trigger element, accidental enabling of the equipment is avoided when the user is in the vicinity of the equipment but does not wish to operate it, or in the presence of interfering signals from similar portable devices in the vicinity or from other sources. In most cases the trigger element can be incorporated as part of a normal operating device associated with the equipment such as, for example, a push button in the case of a cash register or a door handle in the case of a door at the entrance to a restricted area. The user is thus not required to deviate from normal existing practices in making use of the invention, in other words, no conscious act such as the operation of a separate push button or the insertion of a card in a card reader is required.

Preferably, the trigger element is a touch plate or touch surface which is also connected to a code receiver, so that the identification code can be transmitted from the portable device, via a conductive portion of the latter, by electrical conduction through the user's body to the touch plate or surface, simultaneously with the operation of a switch or handle. This provides added security against accidental operation, and can also reduce power consumption in the portable device since the transmitted signal can be relatively weak compared with a signal transmitted through the atmosphere.

For convenience, the portable device is a wrist watch having, in addition to conventional crystal controlled electronic watch circuitry, a memory for storing the identification code, and a digital serial encoder for modulating a carrier signal derived from one of the outputs of a frequency divider on the watch circuitry, the modulated signal being applied to the back plate of the watch. Alternatively, the portable device may comprise a separate unit such as a bracelet or pendant in contact with the user's skin.

The portable device and the control unit may be arranged such that the receiver responds to a single individual in a given manner, to a group of individuals in the same manner, or to various individuals in different manners.

The invention will now be described by way of example with reference to the drawings in which.

Figure 1:
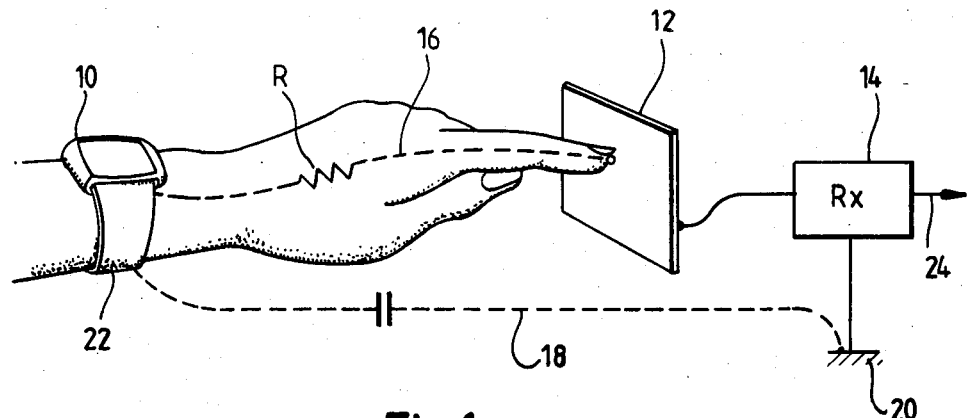
FIG. 1 is a diagram illustrating one embodiment of the invention in simplified form.

Referring to FIG. 1, a security system in accordance with the invention comprises a portable device 10 in the form of a wrist watch having a memory for storing a unique identification code and means for transmitting the code as a digitally modulated alternating signal through the user's hand and finger to a conductive touch element in the form of a plate 12 forming part of a control unit including a signal receiver 14. The electrical path 16 followed by the signal is illustrated diagrammatically in FIG. 1 by a dotted line extending from the back plate of the watch 10 through a resistance R, which is generally in the range 50k$\Omega$ to 1M$\Omega$ and typically 200k$\Omega$, to the user's fingertip where it contacts the touch plate 12. The return path 18 for the signal represents a capacitive link between the chassis 20 of the control unit and the watch bracelet 22, although in fact the user's body as a whole can act as a conductive mass capacitively coupled to the control unit. The output 24 of the receiver 14 feeds the signal to decoding and comparison circuitry for enabling equipment connected to the control unit. Such equipment may be a door having a metal handle or plate which acts as the touch element 12, the control unit enabling an electrically driven lock in the door. It may be a motor vehicle where the touch element 12 is a metal key inserted in a door lock and the control unit output enables the ignition system. It may be any machine or apparatus which is operated or enabled by pressing a pushbutton or operating a switch, in which case the touch element 12 is incorporated in the pushbutton or switch as an exposed metallic portion thereof. Such apparatus includes in particular a cash till, or a computer to which only certain authorized users are allowed access.

Figure 2:
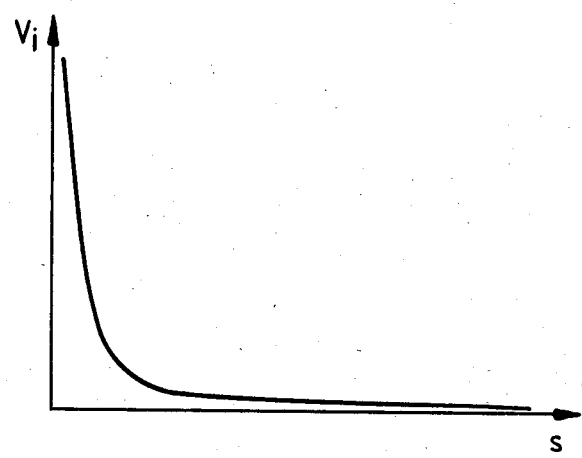
FIG. 2 is a graph illustrating the variation in received signal strength in relation to distance from a touch plate.

It has been found that an alternating signal having a carrier frequency in the range of from 10 kHz to 500 kHz is suitable for conduction through the body, and that the received signal strength at the touch plate 12 is considerably stronger when the user touches the plate 12 than when his finger is merely close to the plate 12 but not touching it. An idea of the manner in which the signal strength varies with distance is given by the graph of FIG. 2, in which the received voltage is represented by $V_i$ and the spacing between the user and the touch plate is represented by s. The sharp increase in signal strength at the point of contact provides a useful means of discriminating between the touching and non-touching states so as to avoid accidental enabling of equipment connected to the control unit by radiated signals.

Figure 3:
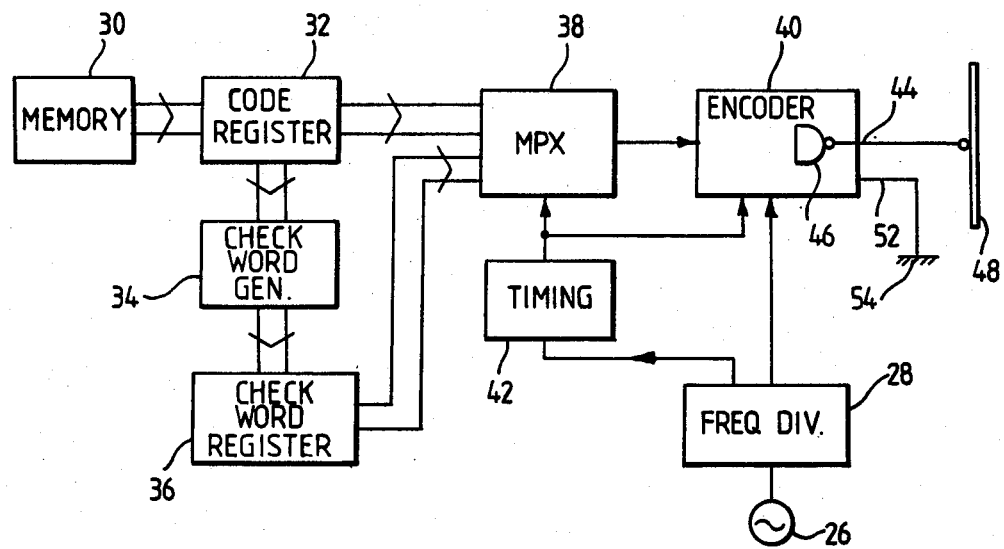
FIG. 3 is an electrical block diagram of a portable device for use in a system in accordance with the invention.
Figure 4:
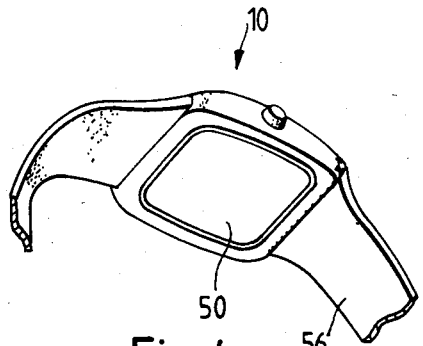
FIG. 4 is a perspective view of a portable device of one type in the form of a wrist watch.
Figure 5:
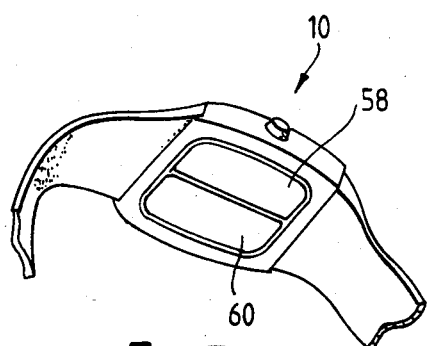
FIG. 5 is a perspective view of a portable device of another type in the form of a wrist watch.

The electrical circuitry of the portable device 10 is shown in block diagram form in FIG. 3. This circuitry is particularly suited to incorporation in an electronic watch since known watches already include a suitable oscillator 26 and frequency divider 28. The identification code is stored in a memory 30 which can be volatile or non-volatile, although the volatile type has the advantage that it can be made more easily programmable by the owner of the security system and the code is easily changed. The code is periodically fed as a parallel word to a code register 32 which is in turn coupled to a check word generator for generating a check word for transmission with the code word. The code word and the check word are presented in parallel form by the code register 32 and a check word register 36 to a multiplexing circuit 38 which transmits the code word and check word to a digital encoder 40 in serial form as a sequence of digital bits having a repetition rate of approximately 3 kHz. The timing of the serial transmission is controlled by a timing circuit 42 which is in turn clocked from a first output of the divider 28. The code word and check word pulses are combined in the encoder 40 in known manner with a 32 kHz carrier signal obtained from a second output of the divider 28 to produce a pulse-position-modulated signal at the encoder output 44. In this embodiment, the output device of the encoder is a CMOS gate 46. Such gates have an output impedance which is considerably lower than the resistance R of the conduction path 16 (FIG. 1). This low impedance signal output 46 is coupled to a conductive portion 48 of the watch 10, for example an isolated back plate 50 as shown in FIG. 4. It has been found that signal transmission is enhanced if the 'ground' line of the encoder 40 is connected as a reference output 52 to another conductive part 54 (FIG. 3) of the watch, e.g. the bracelet 56 (FIG. 4). Alternatively, the two outputs 44 and 52 may be coupled to respective electrically isolated halves 58 and 60 of the back plate, as shown in FIG. 5.

Figure 6:
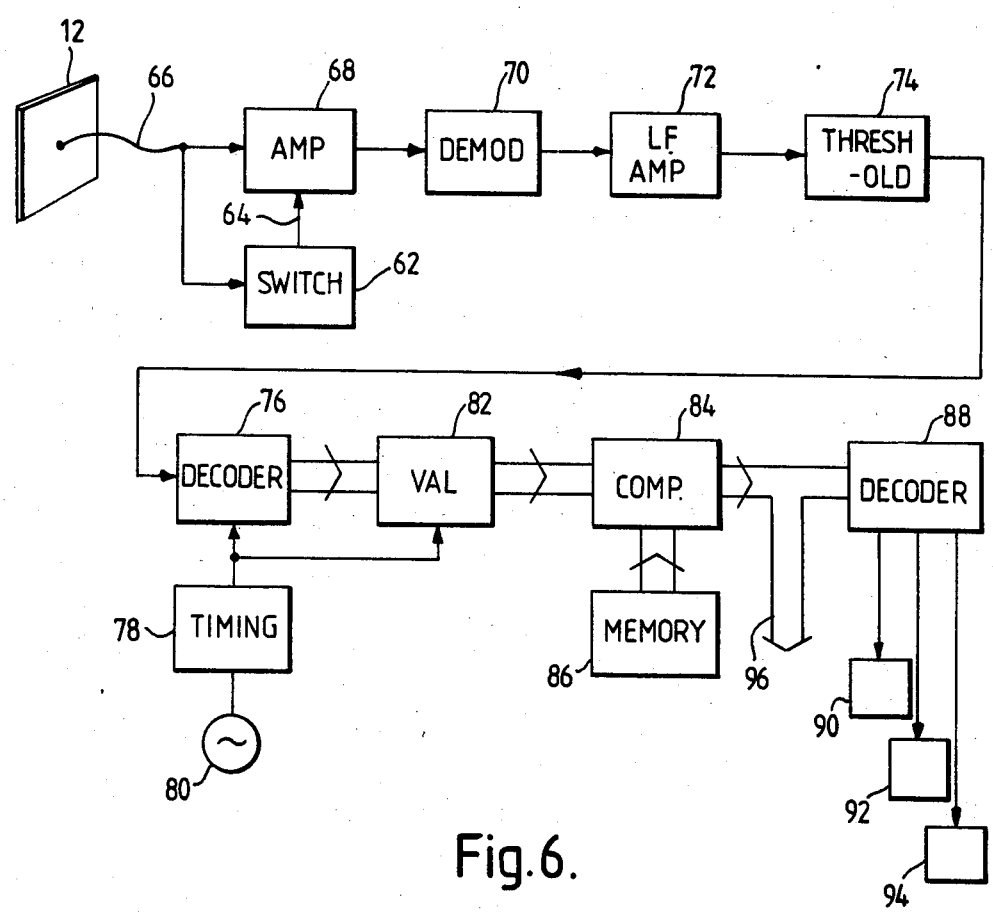
FIG. 6 is an electrical block diagram of a control unit for use in a system in accordance with the invention.

The control unit is shown in more detail in the block diagram of FIG. 6. In this embodiment the touch element 12 serves two purposes. Firstly it acts as the contact for receiving the identification signal from the user's finger, and secondly it is the sensing element of a conventional touch switching device 62 acting in known manner using mains pick-up or capacitance change to sense the presence of the user's finger in physical contact with the element 12. This dual purpose aspect serves to confine reception of signals to the touching condition so as to minimise the chance of false responses to purely radiated signals. By using the switching device 62 to disable the receiver circuitry via link 64, the system substantially ensures that the receiver circuitry will be activated only when a signal of sufficient strength for reliable decoding, i.e. the identification code, is present at the receiving circuitry input.

Thus, when the user touches the touch element 12, the signal transmitted by the watch 10 is fed via a screened cable 66 to a tuned amplifier 68. The amplifier has a high input impedance (in the order of 10MΩ) such as provided by an FET operational amplifier, and is connected as an active bandpass filter tuned to 32 kHz. Providing the presence of the user's finger is sensed by switching device 62, the amplified signal is demodulated by demodulator 70, amplified in low-frequency amplifier 72, and fed as a squared pulse signal by a digital threshold circuit 74 to a digital serial decoder 76. This decoder reconstitutes the code word and check word in parallel form under the control of a timing circuit 78 clocked by oscillator 80, the two words being fed to a validation circuit 82 in which the code word is checked against the check word to detect any transmission errors. The code word having been validated, it is passed to a comparator 84 where it is compared with a digital access code stored in memory 86.

In this embodiment a plurality of access codes are stored in memory 86, so that the control unit can provide different outputs in response to different identification codes which it recognises. Thus the comparator produces an output word which is decoded in an output decoder 88 to activate any one of three equipment enabling security circuits 90, 92 and 94. In addition, a multiple bit output 96 is coupled to the comparator 84 so that the control unit can be linked to a computer system for alternative controlling functions.

It is important to limit power consumption of the portable device 12 to maximise battery life. Significant current consumption of MOS circuitry as used in electronic watches occurs only on transitions between logic states. 32 kHz has been chosen as the carrier frequency in this embodiment because it is sufficiently low to maintain reasonably low current consumption, yet sufficiently high to allow transmission of, for example, a 16 bit pulse train at a sufficiently high rate. The frequency also falls with the range mentioned above for conduction through the body, and it is also a frequency commonly generated in conventional watch circuitry. The current consumption of the embodiment of FIG. 3 allows a battery life in excess of 1 year using a standard electronic watch battery. The circuitry shown in FIG. 3 is preferably incorporated on one or two silicon chips by large scale integration techniques so as to fit within a normal size watch casing.

Where extended cell life is important, the portable device 12 may include a solar cell for charging its battery, or alternatively, the device may include means for recharging the battery when the watch is not being worn. Such recharging may be by inductive coupling or via external contacts engaging contacts in the cradle.

As a further option, the device 12 may have an activation push button which energizes the identification code transmitting circuitry for a limited period, which may be any period from a few minutes to several hours, after which the device reverts to normal watch operation. This increases battery life in applications where the device is used only infrequently.

A number of methods may be employed for programming the identification code into the memory of the portable device 12. These include direct electrical connection for parallel or serial feeding of a code signal to the memory, serial optical input via an appropriate sensor exposed when the watch back is removed, inductive coupling, and manual setting by means of normal push buttons as used in existing electronic watches.

The control unit does not have the same space limitations, and miniature selector switches can be used. The unit may also be arranged to 'learn' a new received identification code for future recognition of the new code.

I claim:

1. A security system for confining the use of equipment to an authorised user or users, wherein the system comprises:
   (i) at least one portable device to be worn or carried by a respective authorised user, the device having means for storing a respective unique digital identification code, means for transmitting the code in a predetermined format, and, coupled to an output of said transmitting means, an exposed conductive portion arranged, when in use, to be in contact with the user's skin; and
   (ii) a control unit to be coupled to the said equipment, the unit comprising means, having an electrical contact surface for receiving the transmitted code when the user touches said contact surface, means for comparing the code with an internally stored access code, and means for enabling said equipment only when said comparing means detects a match between the transmitted code and the access code.

2. A security system according to claim 1, wherein said trigger means include a touch sensitive electrical switch.

3. A security system for confining the use of equipment to authorised users, wherein the system comprises:
   (i) at least one portable device to be worn or carried by a respective authorised user, the device having a store for storing a respective unique digital identification code, a transmitter for transmitting the code in a predetermined format, and, coupled to the output of the transmitter, an exposed conductive portion arranged to be in contact with the user's skin;
   (ii) a control unit to be coupled to the said equipment, the unit comprising an electrically conductive touch surface operable to receive the transmitted code from the portable device by electrical conduction through the user's body when the user touches the touch plate or surface, detection circuitry coupled to the plate or surface for comparing the transmitted code with a stored access code and for producing an output signal when the transmitted code matches the access code, and a security circuit for enabling the said equipment in response to the output signal.

4. A security system according to claim 3, wherein the touch surface forms part of a switching device for activating the detection circuitry.

5. A security system according to claim 4, wherein the switching device is a mechanical switch.

6. A security system according to claim 4, wherein the switching device is a touch sensitive electronic switch.

7. A security system according to claim 3, wherein said at least one portable device comprises a reference oscillator and a frequency divider, a memory for storing the said identification code, a digital serial encoder having a carrier signal input connected to an output of the frequency divider and a code input for receiving the identification code in serial form and an output coupled to the said conductive portion.

8. A security system according to claim 7, wherein the encoder comprises an MOS integrated circuit having its output connected directly to the conductive portion.

9. A security system according to claim 3 wherein said transmitting means includes a signal output and a reference output, and wherein said at least one portable device has two exposed electrically conductive portions connected, respectively to the signal output and to the reference output.

10. A security system according to claim 3, wherein the identification code is transmitted as a pulse-position-modulated signal having a carrier frequency in the range 10 kHz to 500 kHz.

11. A security system according to claim 1, wherein said control unit includes trigger means, actuable by the user to put the control unit in an enabled condition for receiving and comparing the transmitted code.

12. A security system according to claim 1, wherein said transmitting means includes first and second outputs, and wherein said at least one portable device has first and second exposed electrically conductive portions coupled to said first and second outputs, respectively.

13. An access control system comprising:
    (i) a portable device to be worn or carried by an authorised user of the system, the device having a store for storing a respective identification code, a transmitter for transmitting the code in a predetermined format, and, coupled to an output of the transmitter, an exposed electrically conductive portion arranged to be in contact with the user's skin; and
    (ii) An authorised user detector comprising a receiver having an electrically conductive input element arranged for electrical connection to the user's skin when in use whereby the transmitted code is received at the receiver by electrical conduction in the user's body, and comparison circuitry coupled to the receiver for comparing the transmitted code with a stored access code and for producing an access enabling signal when the transmitted code matches the access code.

14. A system according to claim 13 including receiver disabling means coupled to the receiver.

15. A system according to claim 14, wherein the disabling means comprises a touch sensitive switch device.

16. A system according to claim 13, wherein the transmitter has first and second outputs, and wherein the portable device has first and second exposed electrically conductive portions coupled to the said first and second outputs, respectively.

17. A system according to claim 13, wherein the portable device includes power conservation means for energizing the transmitter for a limited period.

18. A system according to claim 1, wherein said at least one portable device includes power conservation means for energizing said transmitting means for a limited period.

* * * * *